United States Patent
Freidell

(10) Patent No.: US 7,159,274 B2
(45) Date of Patent: Jan. 9, 2007

(54) VACUUM GROOMING TOOL

(76) Inventor: James E. Freidell, 6910 S. Yukon Way, Littleton, CO (US) 80128

( * ) Notice: Subject to any disclaimer, the term of this patent is extended or adjusted under 35 U.S.C. 154(b) by 194 days.

(21) Appl. No.: 10/147,802

(22) Filed: May 17, 2002

(65) Prior Publication Data

US 2002/0189049 A1    Dec. 19, 2002

Related U.S. Application Data

(60) Provisional application No. 60/291,762, filed on May 17, 2001.

(51) Int. Cl.
*A47L 9/06* (2006.01)
*A01K 13/00* (2006.01)

(52) U.S. Cl. .................... 15/339; 15/402; 15/415.1; 15/419; 119/628; 119/631

(58) Field of Classification Search ............... 15/401, 15/402, 398, 400, 415.1, 418, 419, 416, 339, 15/421, 396, 310, 38, 39; 119/628, 631
See application file for complete search history.

(56) References Cited

U.S. PATENT DOCUMENTS

| 953,267 | A | * | 3/1910 | Heffner et al. ............... 15/402 |
| 963,049 | A | | 7/1910 | Kenney |
| 1,859,132 | A | * | 5/1932 | Fechtenburg .............. 15/402 |
| 1,901,866 | A | | 3/1933 | Bryan |
| 1,936,369 | A | | 11/1933 | Riebel et al. |
| 2,219,802 | A | | 10/1940 | Björkman |
| 2,228,091 | A | | 1/1941 | Smith |
| 2,276,886 | A | | 3/1942 | Smith |
| 2,367,437 | A | | 1/1945 | Salt |
| 2,421,958 | A | | 6/1947 | Moretti |
| 2,523,201 | A | * | 9/1950 | Ellis ......................... 15/339 |
| 2,715,240 | A | | 8/1955 | Pieper et al. |
| 2,780,829 | A | | 2/1957 | Cohen |
| 2,953,808 | A | * | 9/1960 | Carmack .................. 15/402 |
| 3,002,215 | A | | 10/1961 | MacFarland |
| 3,065,491 | A | | 11/1962 | Amador |

(Continued)

FOREIGN PATENT DOCUMENTS

DE    497 159 C    5/1930

(Continued)

OTHER PUBLICATIONS

Central Cleaning Beam Systems, The Short Cut Salon Vacuum System, Date Unknown, 2 Pages.

(Continued)

*Primary Examiner*—Theresa T. Snider
(74) *Attorney, Agent, or Firm*—Paegre & Benson LLP

(57) ABSTRACT

A vacuum grooming tool is disclosed that includes a vacuum nozzle attachable to a vacuum source and has a hollow body with a mouth opening. A grooming device selected from a variety of standard animal grooming hand tools, such as a shedding blade, rake, or de-matting tool, may span the mouth opening. The grooming device is positioned such that the airflow created by the vacuum source flows over at least one side of the grooming device. A vacuum cleaning tool for removing any animal hair from a grooming tool is also disclosed. A vacuum plenum of the cleaning tool is attachable to a vacuum source and has an opening for cleaning the grooming tool in one pass. The cleaning tool can be mounted on a stationary support and may also include a pivot-action mechanism that connects the vacuum grooming tool or the cleaning tool to the vacuum source.

11 Claims, 13 Drawing Sheets

1000

U.S. PATENT DOCUMENTS

| | | | |
|---|---|---|---|
| 3,308,500 A | 3/1967 | Woodruff | |
| 3,538,533 A | 11/1970 | Woods | |
| 3,574,885 A | 4/1971 | Jones | |
| 3,668,736 A * | 6/1972 | Loscalzo | 15/402 |
| 3,685,089 A | 8/1972 | Lagerstrom | |
| 3,708,824 A | 1/1973 | Holubinka | |
| 3,744,082 A | 7/1973 | Marshall | |
| 3,771,192 A | 11/1973 | Zaleski | |
| 3,771,193 A | 11/1973 | Hageal | |
| 3,787,920 A | 1/1974 | Evans et al. | |
| 3,797,066 A * | 3/1974 | Zaidan | 15/402 |
| 3,800,359 A | 4/1974 | Howard et al. | |
| 3,816,872 A | 6/1974 | Bayless et al. | |
| 3,818,540 A | 6/1974 | Martinec et al. | |
| 3,955,238 A | 5/1976 | Remijas | |
| 3,965,527 A * | 6/1976 | George | 15/396 |
| 4,040,390 A * | 8/1977 | Rosenbaum | 119/631 |
| 4,042,995 A | 8/1977 | Varon | |
| 4,052,249 A | 10/1977 | Bruce et al. | |
| 4,087,879 A | 5/1978 | Spence | |
| 4,123,800 A | 10/1978 | Mazzei | 366/150 |
| 4,156,298 A | 5/1979 | Spence | |
| 4,190,924 A * | 3/1980 | Nicholson | 119/631 |
| 4,218,806 A | 8/1980 | Cohn | |
| 4,630,329 A | 12/1986 | Shores | |
| 4,656,687 A | 4/1987 | Wei | |
| 4,799,457 A * | 1/1989 | Gordon | 119/631 |
| 4,904,988 A | 2/1990 | Nesbit et al. | |
| 4,947,799 A | 8/1990 | Parker | |
| 5,067,044 A | 11/1991 | Mallick, Jr. et al. | |
| 5,088,199 A | 2/1992 | Romani | |
| 5,095,853 A | 3/1992 | Kruger | 119/85 |
| 5,211,131 A | 5/1993 | Plyler | |
| 5,435,327 A | 7/1995 | Ho | |
| 5,491,870 A * | 2/1996 | Holmes | 15/310 |
| 5,518,020 A | 5/1996 | Nowicki et al. | 137/216 |
| 5,655,481 A | 8/1997 | Trahan | 119/606 |
| 5,674,312 A | 10/1997 | Mazzei | 95/261 |
| 5,678,593 A | 10/1997 | Lockhart | 167/268 |
| 5,768,747 A | 6/1998 | Smith | 15/402 |
| 5,863,128 A | 1/1999 | Mazzei | 366/163.2 |
| 5,870,851 A | 2/1999 | Shoemaker | 43/114 |
| 5,881,462 A | 3/1999 | Romani | 30/133 |
| 5,904,196 A | 5/1999 | Wickers | |
| 5,922,139 A | 7/1999 | Gilbert | |
| 5,924,202 A | 7/1999 | Romani | 30/133 |
| 5,944,031 A * | 8/1999 | Farley et al. | 15/398 |
| 6,055,938 A | 5/2000 | Klein | |
| 6,230,659 B1 * | 5/2001 | Karlsson | 119/601 |
| 6,293,294 B1 | 9/2001 | Loeb et al. | 137/1 |
| 6,571,478 B1 | 6/2003 | Romani et al. | |
| 6,782,846 B1 | 8/2004 | Porter et al. | |
| 2002/0166512 A1 * | 11/2002 | Corbett | 119/611 |

FOREIGN PATENT DOCUMENTS

| | | |
|---|---|---|
| DE | 971 687 C | 3/1959 |
| DE | 297 15 247 U | 10/1997 |
| FR | 2 583 260 A | 12/1986 |
| GB | 283 988 A | 1/1928 |

OTHER PUBLICATIONS

Central Cleaning Beam Systems, Beam Short Cut Salon Vacuum System Installation Instructions, 1996, 6 Pages, Beam Industries and VacuKeen Developments, Inc.

Rockler Woodworking and Hardware, Ecogate Balast Gate Sysetem, 2001, 1 Page, www.rockler.com, Rockler Companies, Inc.

Schlosser Tool & Machinery, Model W1049—Woodstock Dust Collection Separator, 1 Page, Date Unknown, www.schlossertool.com.

Woodstock International, Inc., Dust Collection Separators—W1049, W2049, W2046, 1 Page, www.woodstockinternational.com.

Ecogate, Inc., Ecogate System, Energy Saving Dust Collecting Systems—Ecogate Master System, Ecogate System, 3 Pages, 2001, www.ecogate.com.

Hanvey Specialty Engineering, ArtMaster Elite System, Engineered, Industrial Quality, Clipper Vacuum Systems, Clipper Vac Compared to ArtMaster, Date Unknown, 2 Pages, www.shelby.net.

Hanvey Specialty Engineering, ArtMaster Junior, Engineered, Industrial Quality, Clipper Vacuum Systems, Clipper Vac Compared to ArtMaster, Date Unknown, 5 Pages, www.shelby.net.

Hanvey Specialty Engineering, ArtMaster Ultra Quiet, Ultra-Lite, ArtMaster, Clipper Vacuum Systems—Upgrade Your Clipper Vac System, ArtMaster, Engineered, Industrial Quality, Clipper Vacuum Systems, Date Unknown, 9 Pages, www.shelby.net.

Hanvey Specialty Engineering, TaxiVac, ArtMaster, Engineered, Industrial Quality, Clipper Vacuum Systems, Date Unknown, 2 Pages, www.shelby.net.

Hanvey Specialty Engineering, ArtMaster Central Systems, Clipper Vac Compared to ArtMaster*, ArtMaster, Engineered, Industrial Quality, Clipper Vacuum Systems, Date Unknown, 3 Pages, www.shelby.net.

Hanvey Specialty Engineering, ArtMaster Housekeeping System Options for Clipper Vacuum Systems, Stop Buying All of Those LOUD Shop Vacuums, ArtMaster, Engineered, Industrial Quality, Clipper Vacuum Systems, Date Unknown, 2 Pages, www.shelby.net.

Rheem Manufacturing Company Corporation, MDC Romani Inc. CV=Clipper-Vac, Date Unknown, 1 Page.

MDC Romani, Inc., Clipper VAC Systems, 1999, 6 Pages, www.clippervac.com.

MDC Romani, Inc., Clipper Vac—Clipper Attachments, Date Unknown, 2 Pages, www.clippervac.com.

MDC Romani, Inc., Clipper Vac—Clipper Vac Product Directory, Date Unknown, 4 Pages, www.clippervac.com.

Find a Groomer, Inc., Shedding Controls—Dog Grooming Basics 101 for Pet Groomers, 1997-2005, 3 Pages, www.petgroomer.com.

Find a Groomer, Inc., Brushing & Combing—Dog Grooming Basics 101 for Pet Groomers, 1997-2005, 4 Pages, www.petgroomer.com.

Find a Groomer, Inc., Matted & Tangled Coats—Dog Grooming Basics 101 for Pet Groomers, 1997-2005, 4 Pages, www.petgroomer.com.

Furminator, Inc., About the Treatment—FURminator, SHED-LESS Treatment, Date Unknown, 1 Page, www.furminator.com.

Furminator, Inc., How It Works—FURminator, SHED-LESS Treatment, Date Unknown, 1 Page, www.furminator.com.

Barbara Bird, Grooming—Techniques of Dematting, Pet Services Journal, Jul. 2004, pp. 32-34, 38.

Groomer to Groomer, Just Ask Judy, Jul. 2001, p. 8, 10, and 12.

* cited by examiner

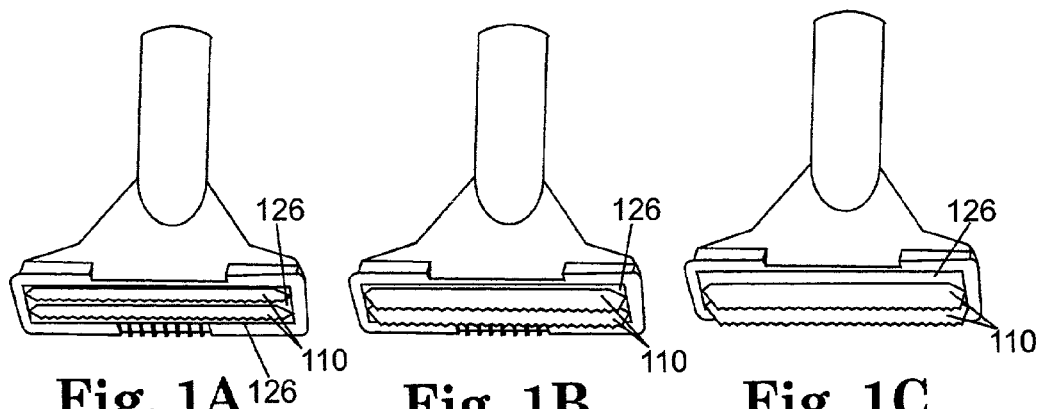
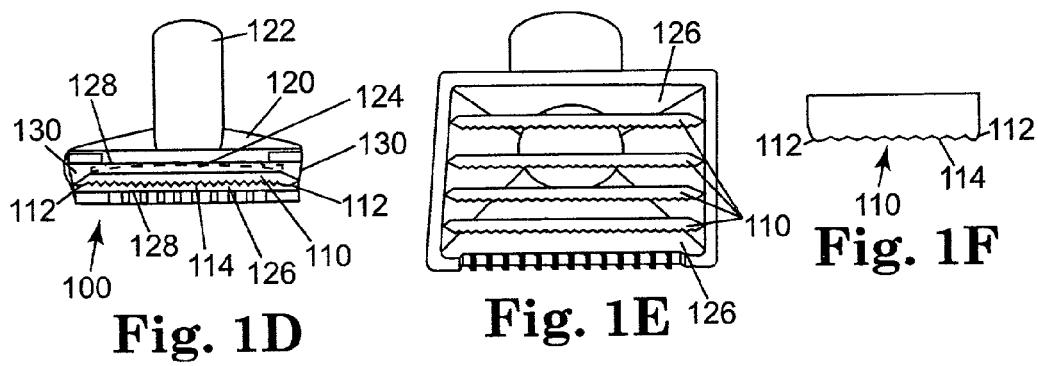
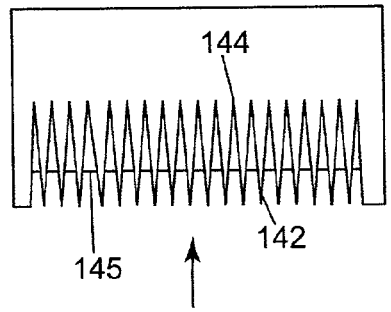
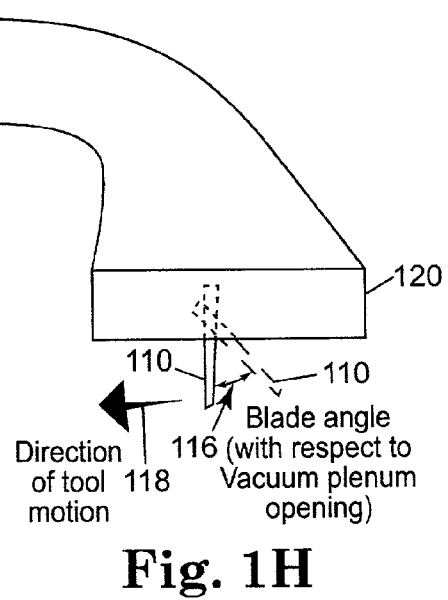
Fig. 1A  Fig. 1B  Fig. 1C
Fig. 1D  Fig. 1E  Fig. 1F
Fig. 1G  Fig. 1H Long Medium Short

VACUUM GROOMING TOOL

CROSS REFERENCE TO RELATED APPLICATION

The present application claims priority to U.S. Provisional Application No. 60/291,762 filed May 17, 2001.

FIELD OF THE INVENTION

The present invention relates generally to animal grooming tools and more particularly to animal grooming vacuum tools.

BACKGROUND OF THE INVENTION

Professional animal groomers deal with a large amount of hair during the grooming process. Hair accumulates on the grooming table, floor, and in the bathing tub. Much of this hair is introduced into the air environment as a result of blow drying, hair stripping, brushing, combing, raking, clipping, shearing, de-shedding, carding, and de-matting operations. Much of this hair is physically handled by the groomer as he/she manually removes accumulated hair from various hand tools such as slicker brushes, combs, and rakes. In this latter case, the groomer must use both hands and either drops extracted hair on the floor or deposits such into a waste receptacle. During the bathing process, an abundance of animal hair often finds its way into the drain causing frequent blockage. Most professional grooming shops have plumbing professionals clean shop bathing drains as frequently as every two weeks as a precautionary measure.

Many states employ licensing and/or regulations requiring that animal hair be cleaned up after grooming each animal before another can be groomed at the same workstation. In practice, either hair accumulates on the floor until which time as the groomer decides it must be cleaned up, or it is cleaned up after each animal. Most professional groomers use a standard wet/dry vacuum to accomplish this clean-up operation. Fewer perform such clean-up with brush, broom and dustpan. The environment containing accumulated hair, dander and pests is recognized as unhealthy for both humans and animals. Airborne hair and dander is one way of transmitting skin ailments and disease between animals, and allergens to humans, confined in closed spaces.

Clean-up time can be a substantial portion of the total time allocated to groom an animal. Most grooming business advisors espouse the need to continuously maintain as clean as possible a grooming environment to appease discerning customers.

Professional groomers often suffer from carpal tunnel syndrome, tendonitis, and other maladies resulting from repetitive motion, particularly repetitive motion that involves strain due to weight or resistance to such motion. Anything that can reduce the number of repetitions and/or relieve strain, particularly in using common hand tools, can reduce the incidence and severity of such maladies.

Pet owners often must deal with volumes of hair naturally shed by many animals. This shed hair accumulates around the home during shedding season, creating a general nuisance and requiring more frequent home vacuuming and cleaning.

One of the problems faced by all groomers is the accumulation of hair on their hand tools (combs, rakes, brushes, etc.) during use. FIG. 9(A) shows a slicker brush before use, and FIG. 9(B) after use. Groomers normally use their free hand to remove the hair (and with slicker brushes in particular, presents a relatively arduous, repetitive task). FIG. 9C illustrates that even rakes and combs are affected.

SUMMARY OF THE INVENTION

The present invention discloses a system of tools which, when attached to a vacuum source, reduces the need for the tool user (groomer) to manually deal with animal hair accumulating on or in such tools during use, or manually clean up hair displaced from the animal during the grooming process. Certain of these tools are used with standard professional grooming hand tools. Others integrate vacuum plenums into and with standard professional grooming tool functionality. Others yet facilitate the drying of animals. These tools also reduce exposure to animal dander and pests often found in animal coats.

Features of this system of tools and/or individual tools (as applicable) include:

1. aerodynamic design to allow operation under vacuum application without significantly contributing to environmental noise;
2. ergonomic design to be lightweight and comfortable to use;
3. increased efficiency, compared to common grooming tools that the invention replaces, as measured in the amount of hair extracted per operational stroke and/or the elimination of operational strokes, both of which can directly translate to reduction of repetitive motion actions and the amount of time required to groom an animal;
4. the ability to automatically capture most animal hair, dander, and pests that otherwise would be released in the environment as a result of the grooming process;
5. designs comparable to the professional hand tools the invention replaces in their ability to properly accommodate animal body contour(s) and varying types of animal hair;
6. the ability to use such tools with a single hand, allowing the groomer the ability to always keep one hand on the animal being groomed;
7. reduction of time devoted to animal drying after bathing;
8. reduction of the amount of hair introduced into bath drains and thereby reducing the incidence of drain clogging resulting from animal bathing;
9. reduction of the acoustic noise environment, particularly during blow drying and clean-up, either in sound pressure level (intensity) reduction or time of exposure to such, or both; and
10. design of certain tools to be usable by animal owners employing a standard home vacuum cleaner (upright or canister) as the vacuum source.

BRIEF DESCRIPTION OF THE DRAWINGS

Other objects and advantages of the invention will become apparent upon reading the following detailed description and upon reference to the drawings in which:

FIG. 1 shows a set of embodiments of the invention in which the vacuum grooming tool includes shedding blade(s);

DETAILED DESCRIPTION OF SPECIFIC EMBODIMENTS

Figure 2C:
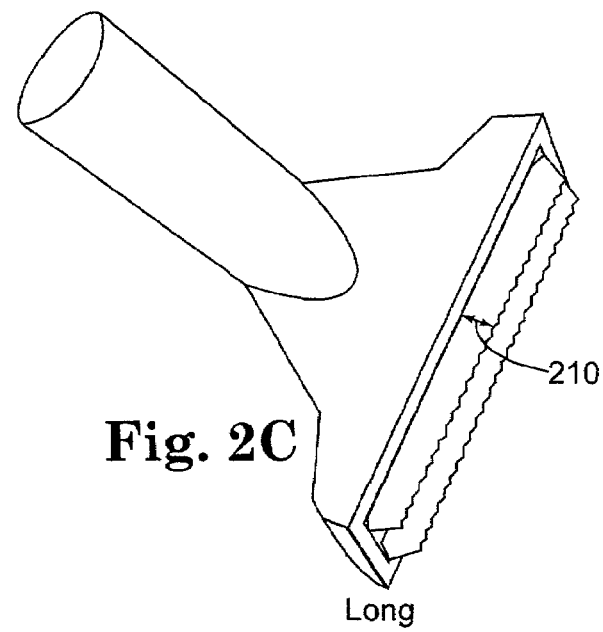
FIG. 2 shows the grooming tools shown in FIGS. 1(A), 1(B) and 1(C), respectively, in a different perspective.

FIG. 1D depicts an animal grooming vacuum tool 100 having an integrated shedding tool blade 110. The device has a suction nozzle 120 having an integrally formed suction pipe 122 to connect to a source of negative pressure (such as a vacuum). The suction pipe 122 is in physical communication with a hollow body 124 terminating in an integrally formed mouth opening 126. In the preferred embodiment, the mouth 126 is substantially rectangular and is defined by a first pair of integrally formed spaced rectangular walls 128 which are substantially parallel to each other and a second pair of integrally formed spaced rectangular walls 130 which are substantially parallel to each other.

The apparatus has one or more substantially straight stainless steel grooming blades 110, illustrated in more detail in FIG. 1(F), disposed within the rectangular mouth opening. Each blade 110 has two shaped and smoothed ends 112, each end is attached to one of the second pair of integrally formed spaced rectangular walls 130. Each blade also has a serrated edge 114 extending outside the plane of the rectangular mouth opening 126. In multiple blade implementations, such as those schematically shown in FIGS. 1(A), 1(B), 1(C) and 1(E) each blade 110 is substantially parallel to the other blades 110 and to the first pair of integrally formed spaced rectangular walls. In addition, the blades 110 are positioned to provide an air passage extending from the mouth opening 126 into the hollow body portion 124 of the nozzle 120 between each of the blades 110 and between the blades 110 and the first pair of integrally formed spaced rectangular walls 128. Better results are achieved if the animal hair can be sucked down from both sides of the blade 110.

Although the mouth 126 of the preferred embodiment is rectangular, those skilled in the art will recognize that other mouth shapes such as ovals may be used, so long as the blades 110, in multiple blade devices, are substantially parallel to each other.

Each blade 110 can be attached to the mouth opening 126 in a variety of ways. For example the blades 110 can be glued to the walls using commercially available epoxies. For additional stability, receiving slots can be cut in the nozzle housing to receive the ends of each blade 110 or the entire edge of the blade 110 opposite the serrated teeth 114. Blades 110 may be constructed out of stainless steel or a plastic blade may be used provided the mold for the serrated edges of such (or post molding operations) give rise to sharp edges. The ends 112 of the blades are shaped (and may be smoothed) in order to minimize sharp corners which could cut or scrape an animal's skin when used. These tools are designed to be pushed or pulled on the animal's coat, not side-to-side, which could injure the coat or underlying skin.

The blade can be formed from a substantially straight piece of the toothed metal, as opposed to trying to maintain a curve in the metal blade. The blade can be integrated with an upholstery nozzle that does not have bristles. The blade can also take the form of any manual shedding blade. For example, in the embodiment illustrated in FIG. 1(G), the blade 140 has faceted teeth 142 with sharply angled channels 144 between the teeth 142 and sharp edges 145 for pulling hair. A blade similar to a hair clipper blade, with teeth that have cutting edges, can also be used.

As illustrated in FIG. 1(H), the orientation of the blade(s) can be set at an angle 116 relative to the direction of tool motion 118 during the intended normal use. Typically, the tool is moved in a direction substantially perpendicular to the rim of the mouth opening 126 so that the vacuuming action is the most efficient. The blade can be perpendicular to the tool motion, or deviate from the perpendicular orientation by an angle 116. Typically, the blade is perpendicular or angled away from the tool motion 118.

Figure 2B:
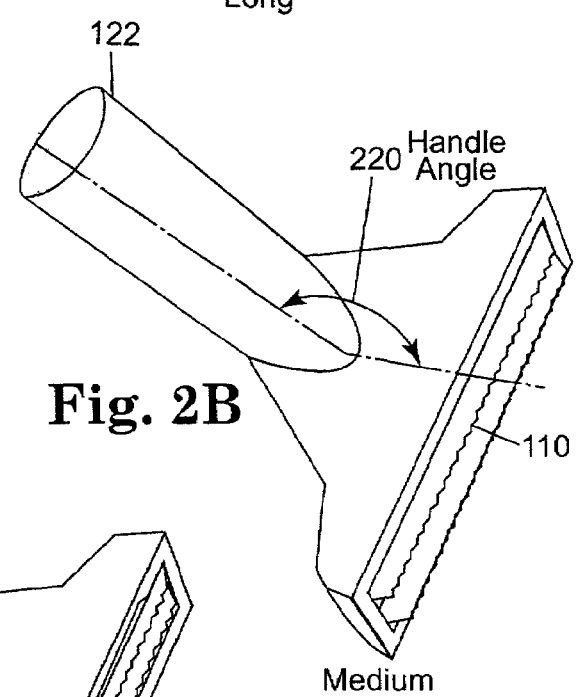
Figure 2A:
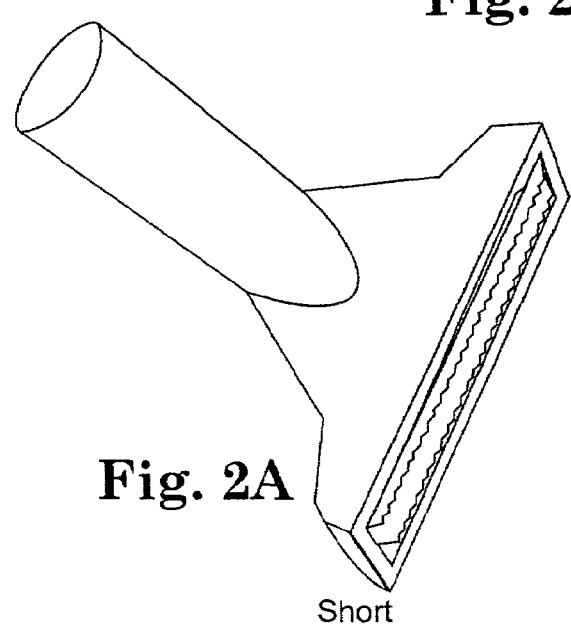
Figure 3C:
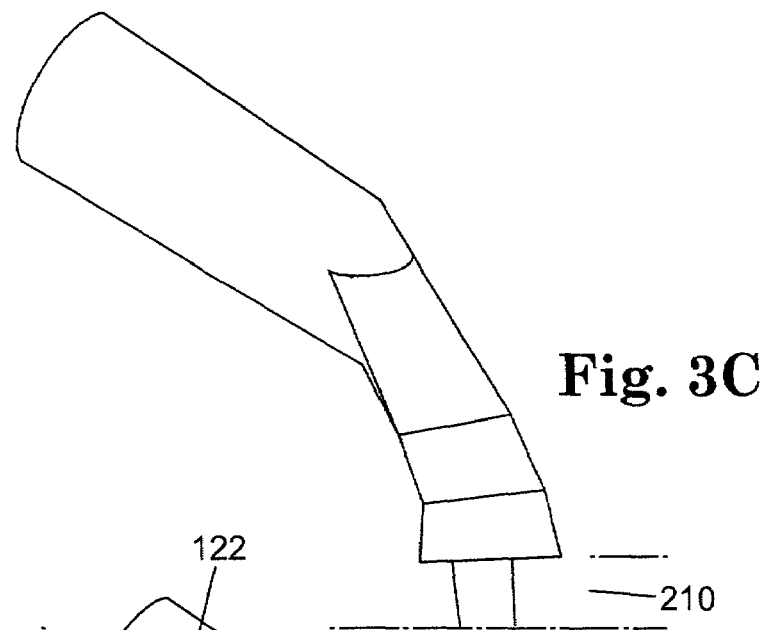
FIG. 3 shows a side view of the grooming tools shown in FIG. 2.
Figure 3B:
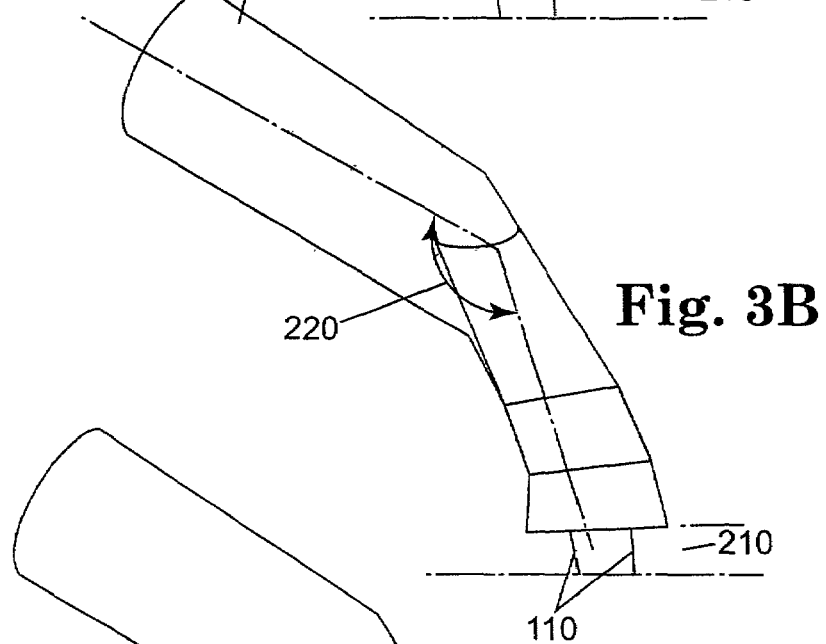
Figure 3A:
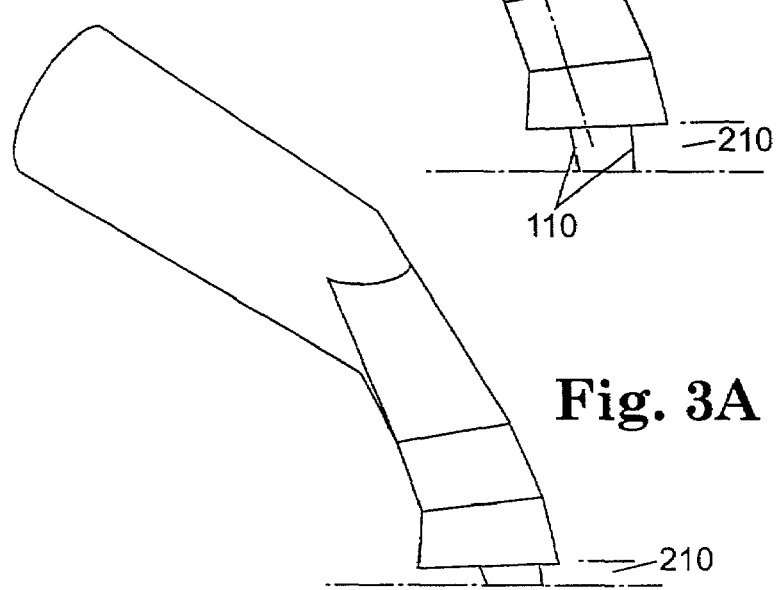

FIGS. 2(A), 2(B) and 2(C) as well as FIGS. 3(A), 3(B) and 3(C) depict, respectively, blades having different heights 210, depending upon the type of animal's coat to be groomed. The angle 220 between the hose attachment point (i.e., suction pipe 122, which serves as the handle) and blade(s) 110 may vary according to customer preference and/or ergonomic design considerations. In the preferred embodiment the blade protrudes between $\frac{1}{8}$" to $\frac{5}{8}$" from the mouth of the nozzle.

The blade could also be mechanically secured to the mouth using a clip or other fastener. Those skilled in the art will recognize that using a mechanical mechanism allows blades to be exchanged.

The present invention will operate with commercially available wet/dry and standard vacuum cleaners. The greater suction of the wet/dry vacuum (compared to the upright or canister vacuum) tends to be more effective in lifting the animal's coat (its hair), almost to the point of standing upright within the vacuum tool. Nevertheless, care should be taken to ensure that too much suction is not used. In the event a strong vacuum is used, an adjustable vacuum suction hose can be used to reduce the vacuum pressure.

Other means can be used to reduce suction. For example, a vacuum with a variable-speed motor drive can be used to create variable suction; a vent, with or without a valve, can also be placed on the grooming tool itself.

Adequate CFM and vacuum pressure is important. In the preferred embodiment, the vacuum pressure should be at least 40 inches of water at or above 90 CFM. Tools may be fabricated with smaller vacuum orifices to accommodate less powerful vacuum cleaners. Similarly, larger tools designed for horses and similar large animals may operate best with greater vacuum pressure and airflow.

FIGS. 1, 2 and 3 show several tools incorporating shedding tool functionality into a vacuum nozzle. The number of blades and overall tool size varies depending upon the type and size of animal, and the characteristics of the animal's hair. For example, Tool E in FIG. 1 is sized for horses and other large animals. The length of the blade 110 is typically a few inches in the preferred embodiment, but may be built larger or smaller to suit the intended use. An example of where a smaller tool may be of value would be one for small dogs and particularly legs of dogs generally. For such a purpose, a tool approximately 1 to 2 in. wide may prove most useful.

Figure 4:
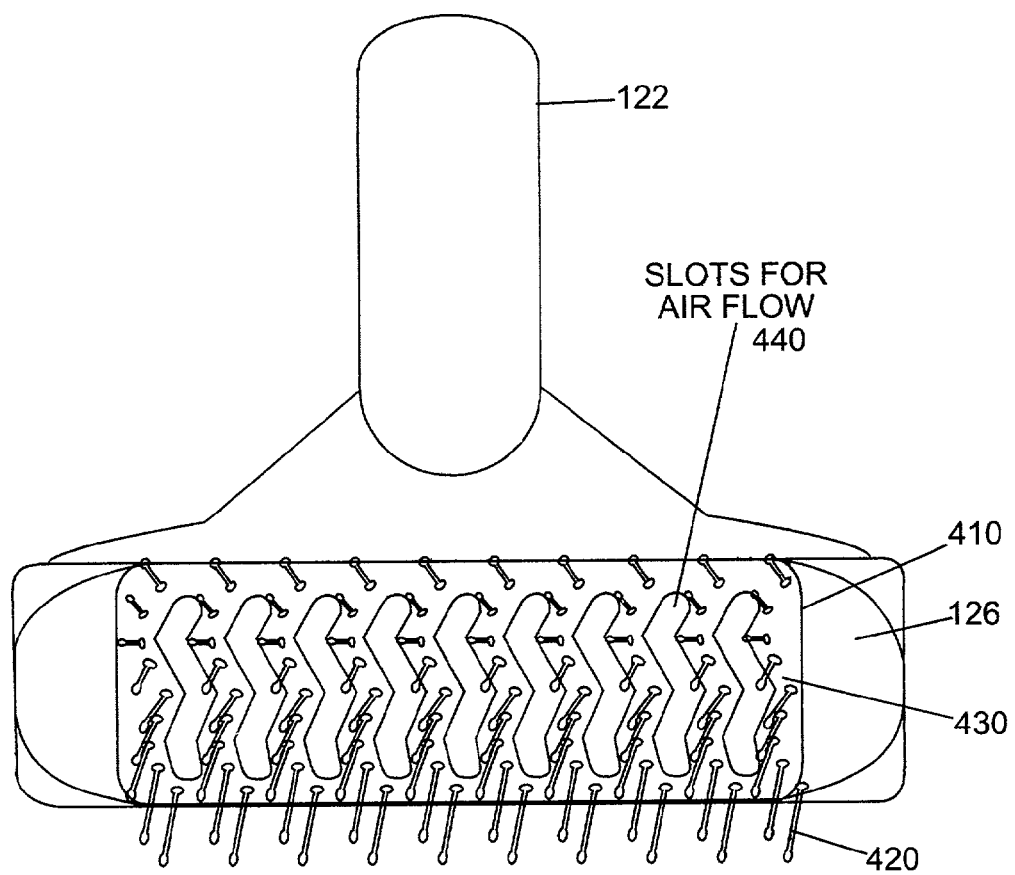
FIG. 4 shows another embodiment of the invention, in which the grooming tool includes a brush.

FIG. 4 discloses an alternate embodiment using a pin brush 410 instead of one or more blades. The pin brush 410 has a large number of plastic or metal wire pins 420 held by base 430. Base 430 may be rigid or flexible. The pins allow air flow from a vacuum to suck hair through the slots 440 formed in the base 430 and the mouth 126 of the device.

The slot configuration of this design also aids blow drying. The slots 440 allow airflow created by the vacuum to help suck hair (and fleas, ticks, dirt, etc.) up into the brush while brushing and to evacuate loosened hair and moisture. Note that hair may wrap around the brush pins (more than the shedding blade) and require additional procedures to remove the hair. Airflow may be induced in reverse (connected to the blower output of a vacuum cleaner for example) to further aid blow drying while brushing the animal.

Those skilled in the art will recognize that the slot size, shape, number and length of pins may all vary depending on the animal's hair length and the required amount of brushing or drying assistance. Overall size may also vary depending on the size of the animal. Instead of brush pins, bristles can also be used in the embodiment shown in FIG. 4.

Figure 5A:
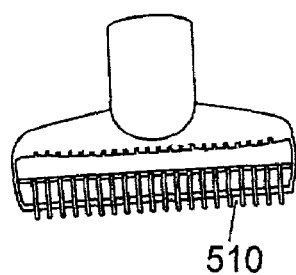
FIG. 5 shows another set of embodiments of the invention, in which the grooming tool includes a comb.
Figure 5B:
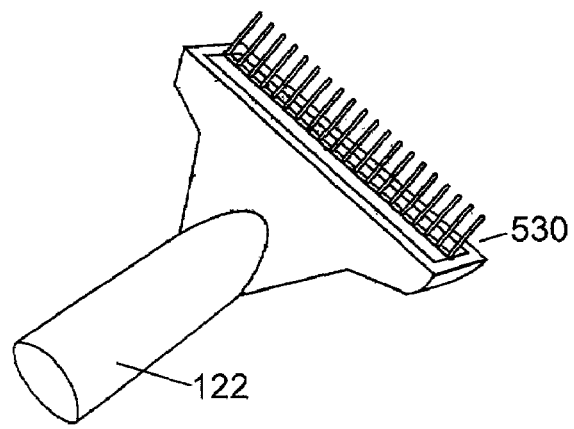
Figure 5C:
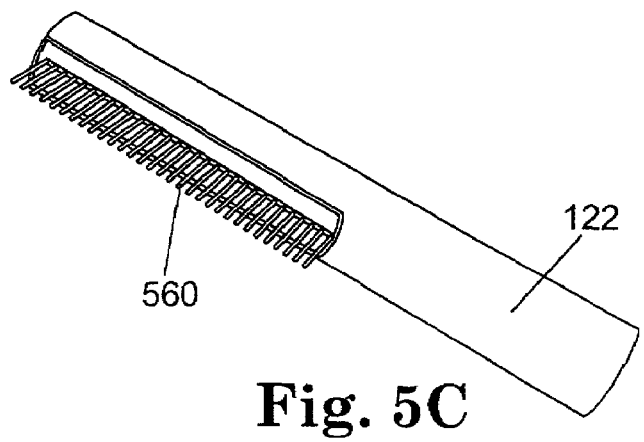

FIG. 5 discloses an alternate embodiment using combs 510, 530 and 560 instead of a blade. Three styles of vacuum combs are shown, respectively. Two (FIGS. 5(A) and 5(B)) of the depicted embodiments are intended to be used like a rake (moved fore and aft). Pulling the rake works better than pushing. The third vacuum comb (FIG. 5(C)) is designed to be used more like a traditional comb (moved sideways).

In all cases, airflow (created by vacuum) flows around both sides of the comb to suck hair up into the comb and evacuate loosened hair (along with dirt, dander, fleas, ticks, etc.). The combs may be constructed of metal or plastic. Comb length and pitch (number of teeth per inch), may be varied according to personal preference and the type and length of hair on the animal to be groomed. Hair will accumulate in the teeth during use, requiring removal. Size may vary also (length of teeth) depending on personal preference and the size of the animal.

Figure 6A:
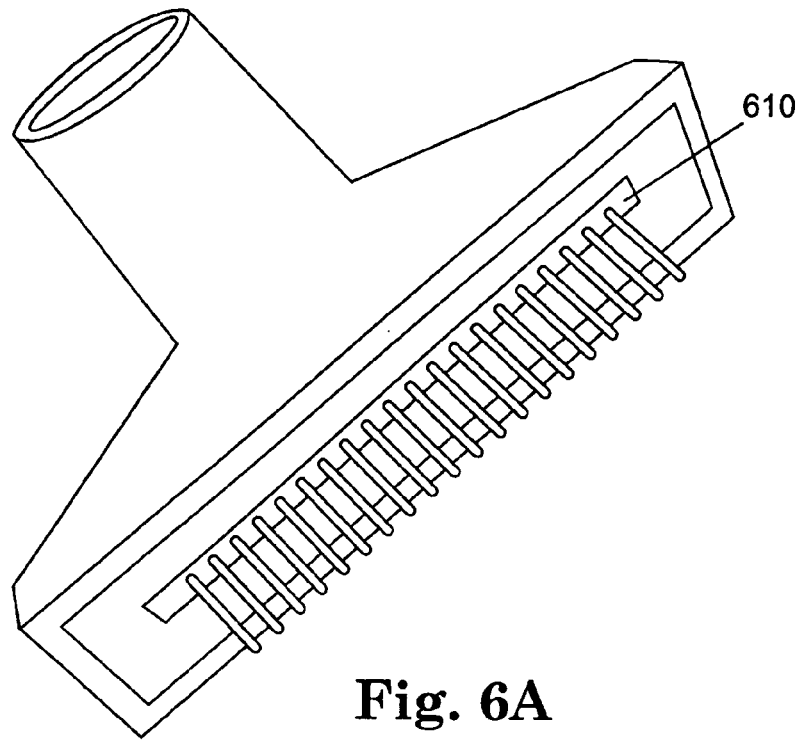
FIG. 6(A) shows another embodiment of the invention, in which the grooming tool includes a rake.
Figure 6B:
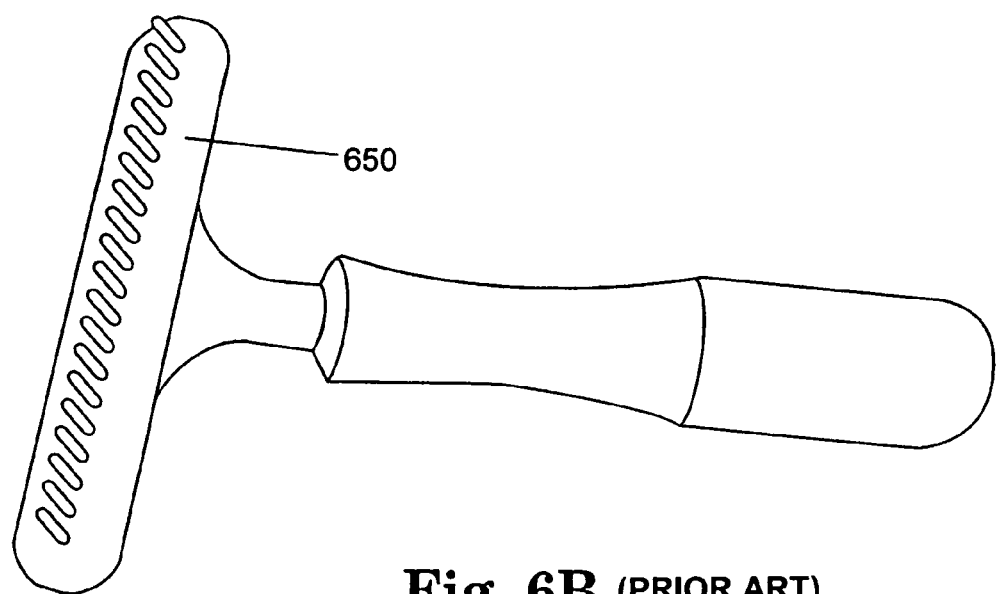
FIG. 6(B) shows a conventional grooming rake.
Figure 7:
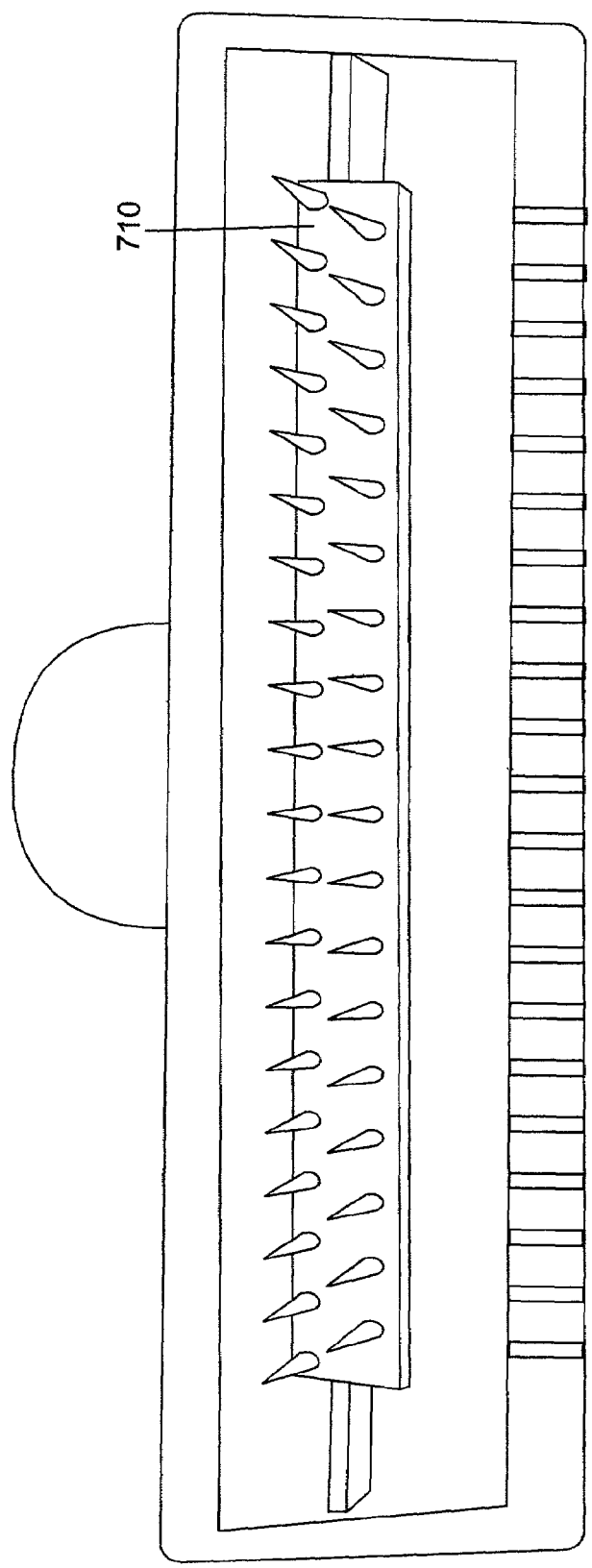
FIG. 7 shows another embodiment of the invention, in which the grooming tool includes a rake.

FIGS. 6(A) and 7 depict rakes 610 and 710, respectively, of embodiments of the present invention. Conventional rakes, such as the one 650 shown in FIG. 6(B), are used for some dog breeds. FIG. 7 shows a double row rake 710 integrated into a vacuum hand tool, creating a vacuum rake in accordance with an embodiment of the present invention. Shown in FIG. 6(A) is a single row Teflon coated rake according to an embodiment of the invention. Again, vacuum causes airflow around the rake so to suck up hair, dirt, fleas, ticks, etc. into the tool. Preferably, air flow would also flow between the rows of the double row rake 710. The devices were made using metal rakes (some Teflon coated), but can be made of any suitable material, such as metal and plastic. The number of teeth, pitch, length of rake, and length of rake tangs may vary, according to the preferences of the user and breed of animal to be groomed. The rake tangs could be made of plastic. In use, hair will build up in the tangs, requiring removal.

Figure 8B:
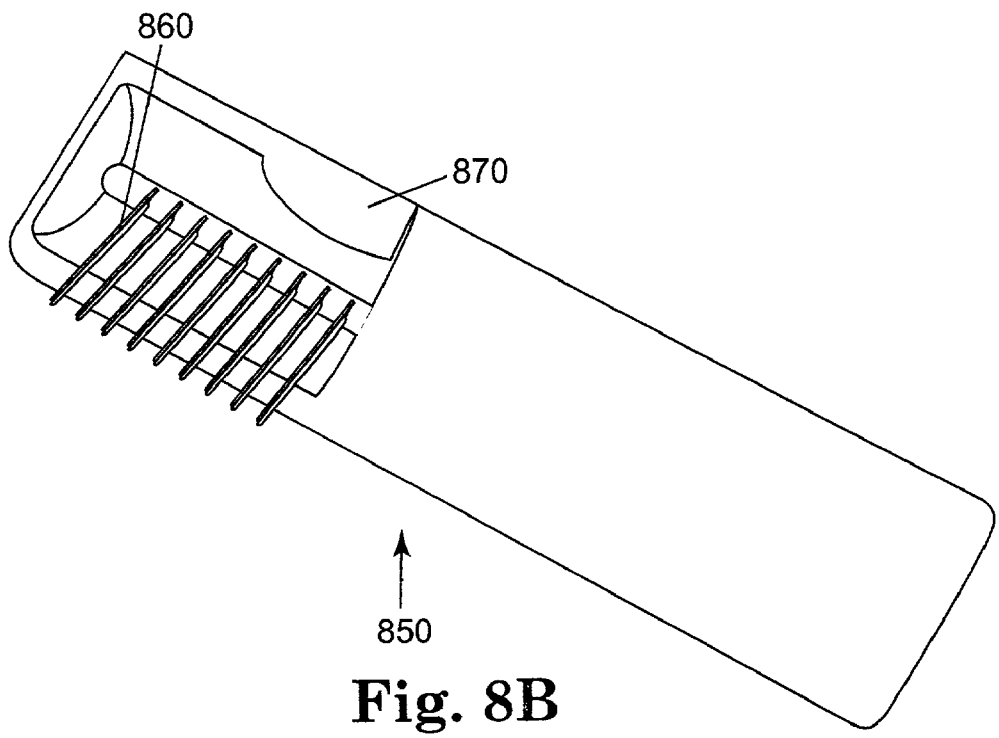
FIG. 8 shows another embodiment of the invention, in which the grooming tool includes a de-matting tool.
Figure 8A:
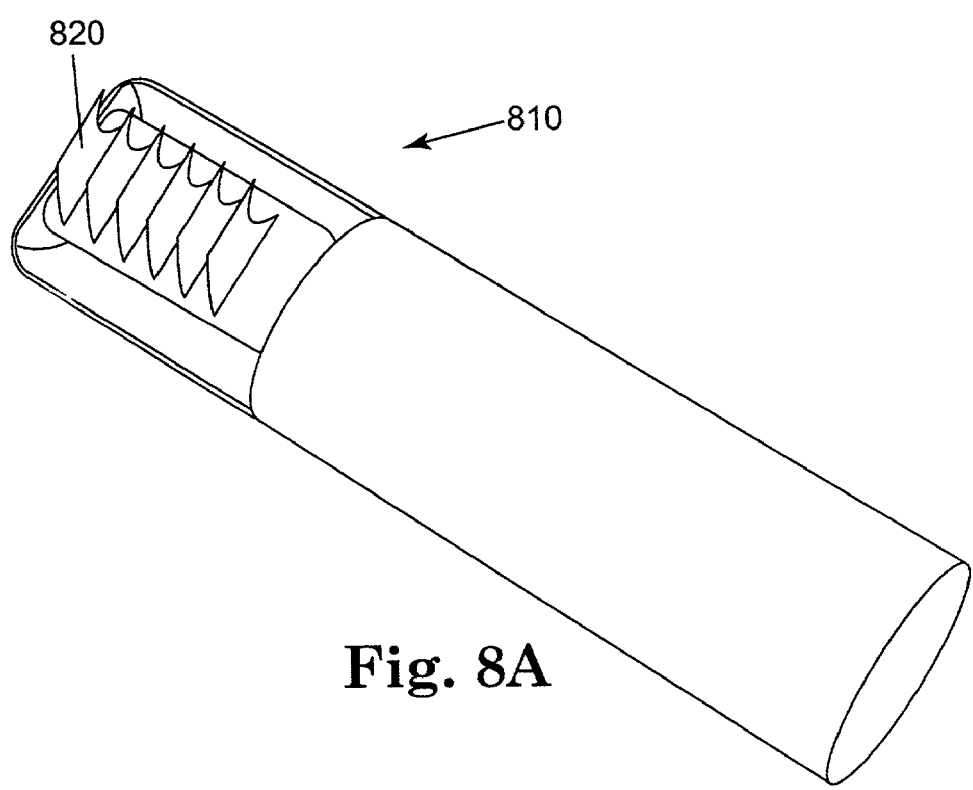

FIG. 8 depicts two vacuum de-matting tools. De-matting tools usually have replaceable blades 820, 860 that are very sharp for cutting hair. The purpose is to cut through hair mats, somewhat shredding such in order to allow a comb to effectively run through the hair. Blades are replaceable in both cases but need not be in either. According to one embodiment, air (from the vacuum) flows around both sides of the blades 820, 860 (the cutting and non-cutting edges), and in one case between the blades 860. A thumb rest 870 is shown on the embodiment illustrated in FIG. 8(B). Blades are reversible to accommodate both right and left-handed users. Blades might be made of plastic. Cut hair may accumulate in the blades during use, requiring removal.

Figure 9E:
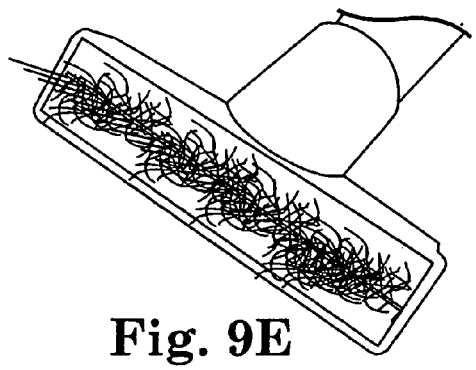
FIGS. 9(D) and 9(E) show examples of the vacuuming grooming tools according to the invention in their condition after use.
Figure 9C:
FIGS. 9(A), 9(B) and 9(C) show examples of conventional grooming tools.
Figure 9D:
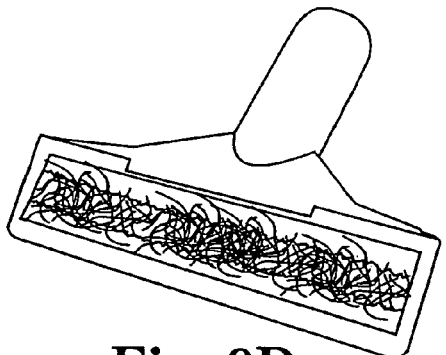
Figure 9B:
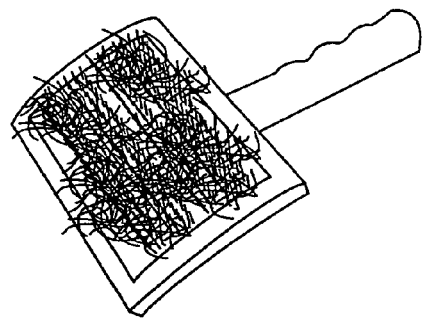
Figure 9A:
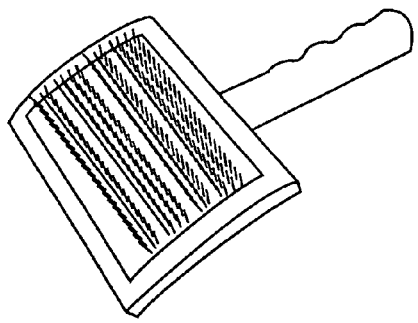

As mentioned above, and illustrated as examples in FIGS. 9(D) and 9(E), the animal hair may accumulate in the tool of the invention during use. FIGS. 10 through 13 depict devices that are used to remove accumulated hair from tools during use, thereby eliminating the need for using ones fingers to do so.

Figure 10A:
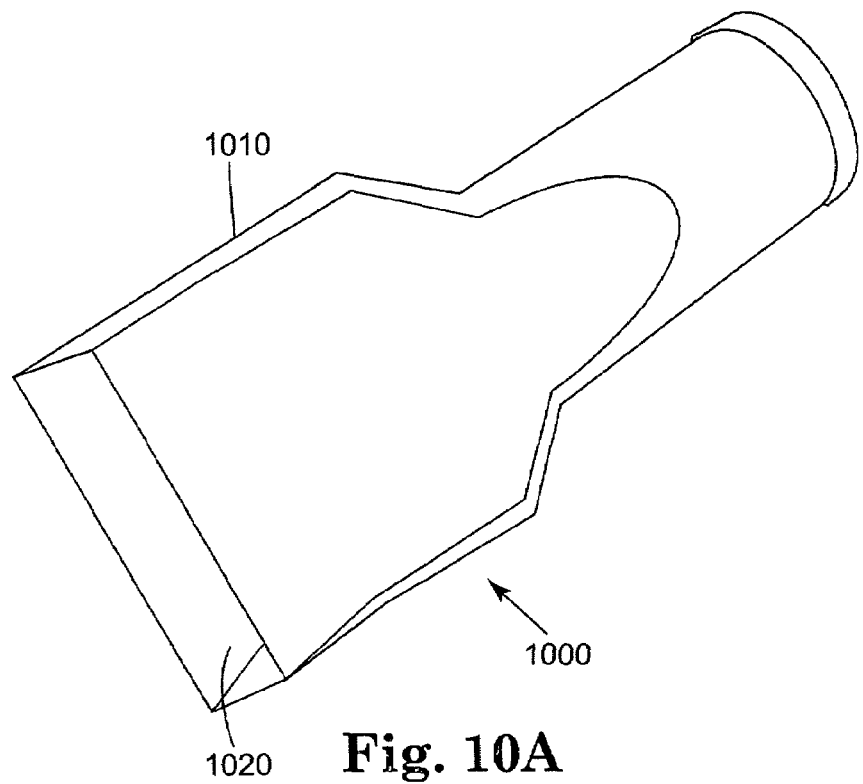
FIGS. 10 and 11 show a grooming tool cleaner according to the invention and examples of various uses of the cleaner.
Figure 10B:
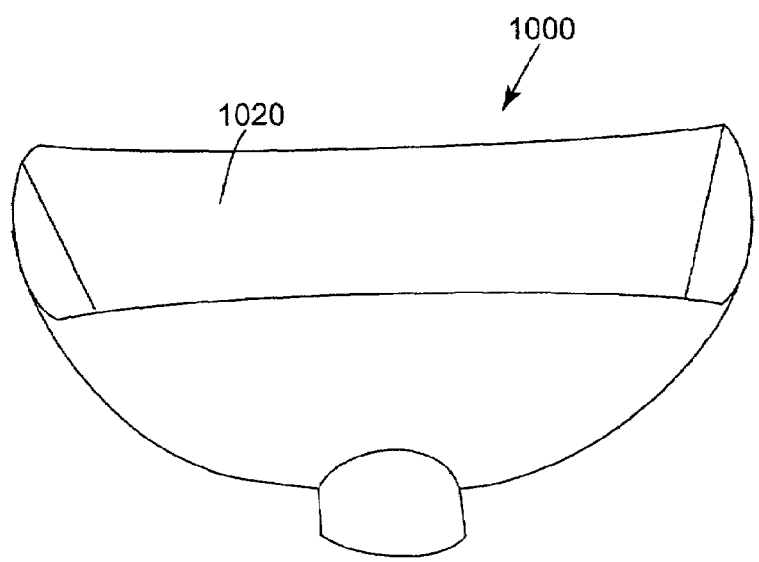
Figure 11A:
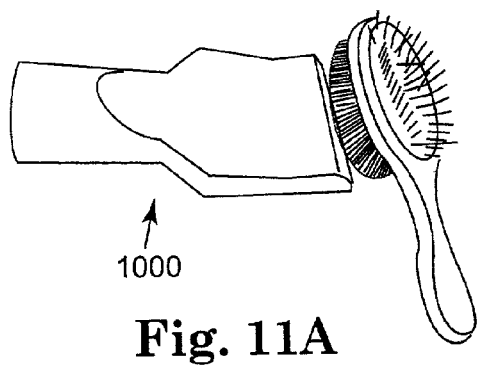
Figure 11B:
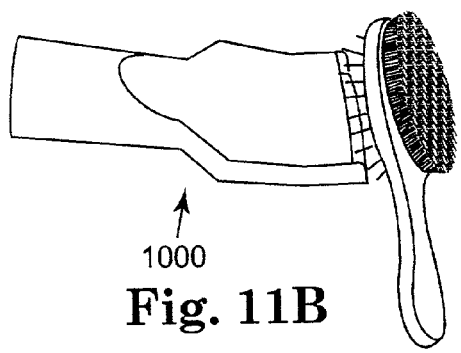
Figure 11C:
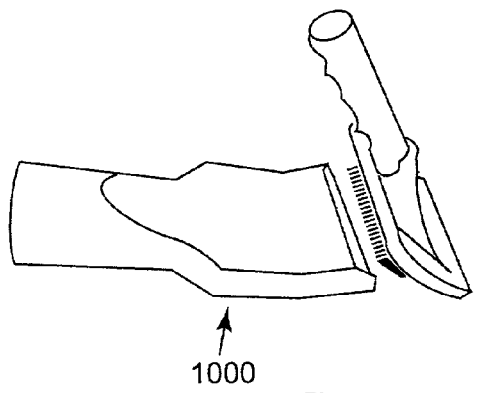
Figure 11D:
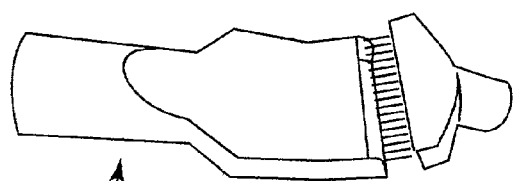
Figure 11E:
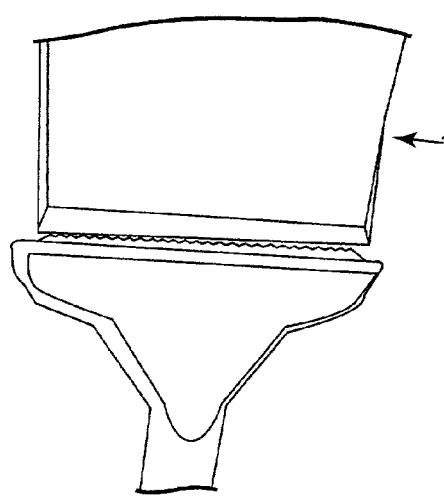
Figure 11F:
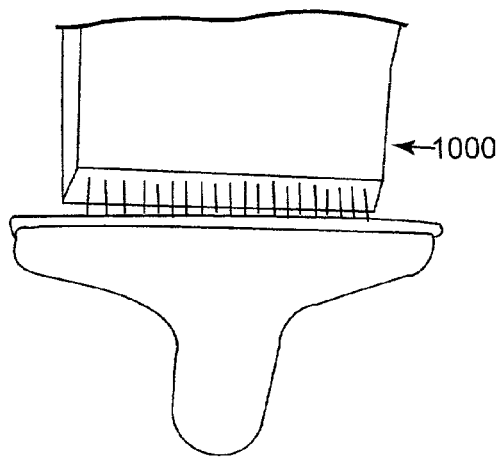

One embodiment is a static vacuum cleaner 1000 shown in FIGS. 10 and 11. A vacuum source (not shown) is adapted to a cleaner head 1010 having an opening 1020 at least the size (length) of most tools. The other dimension (width) is such that maximum airflow is created, yet the opening is adequate to easily accommodate any of the non-brush tools. Brush tools are cleaned across the cleaner opening 1020, providing mechanical scrubbing action to facilitate the vacuum action. Non-brush tools are merely held in the vacuum cleaner opening 1020.

Disconnecting the source of vacuum from the vacuum tool before attempting to remove hair from the tool with the vacuum cleaner typically makes hair removal from said tool easier and more complete (vacuum sources and resultant airflow don't compete).

Figure 12B:
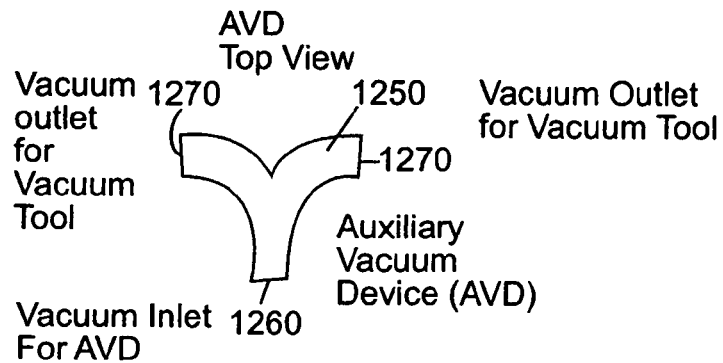
FIGS. 12 and 13 show an articulated cleaner according to an aspect of the invention.
Figure 12A:
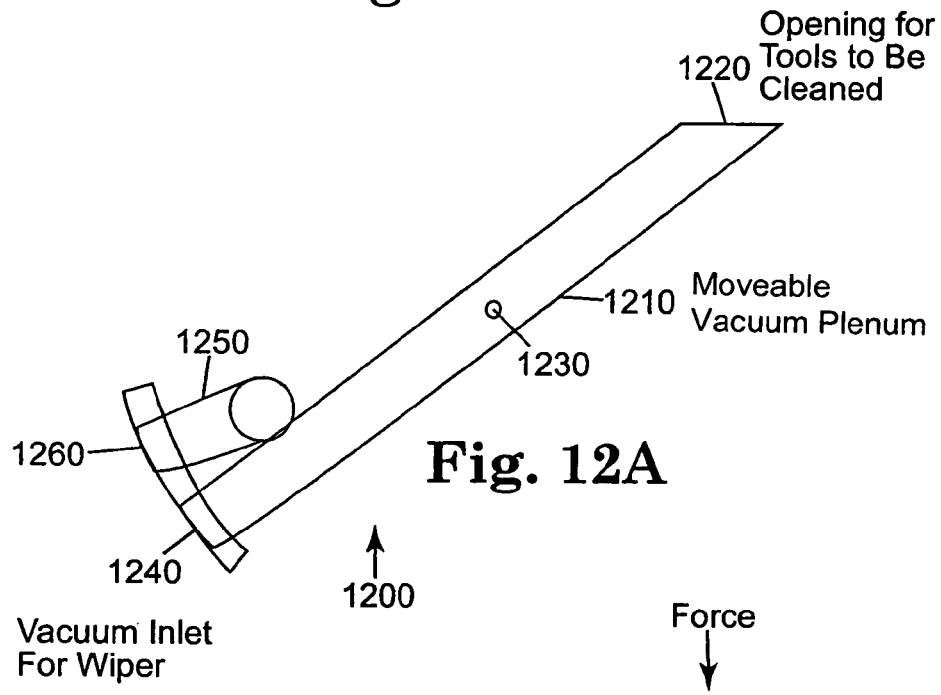
Figure 12C:
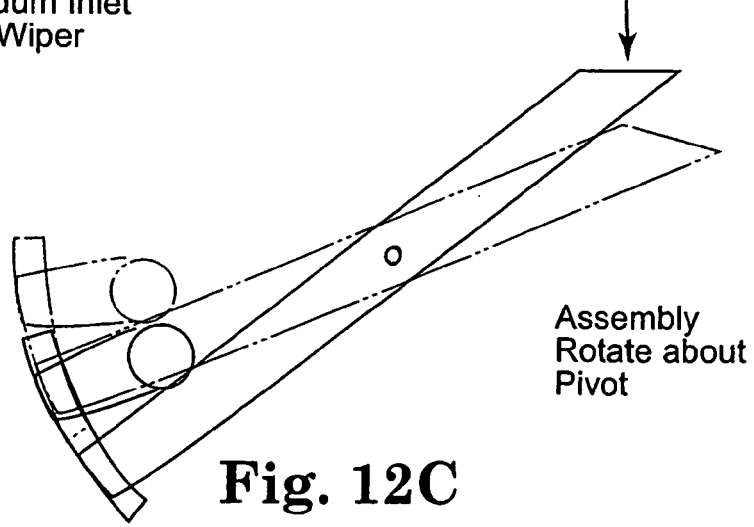
Figure 13A:
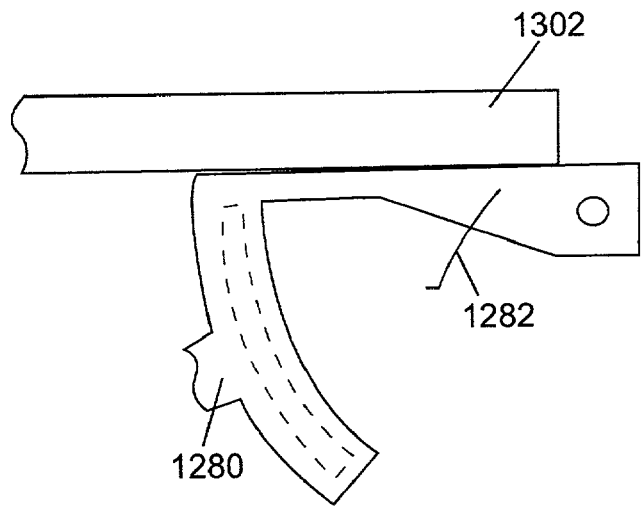
Figure 13B:
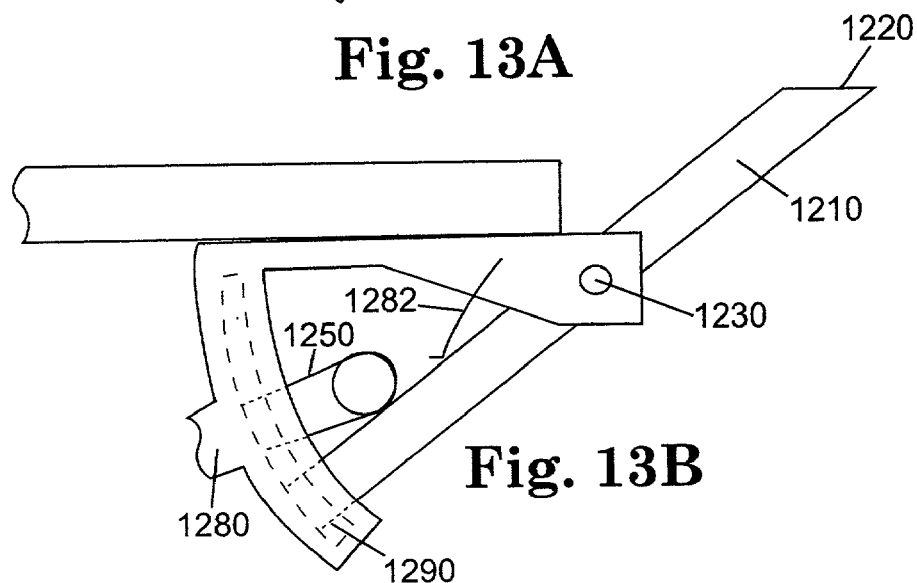

FIGS. 12 and 13 show one of many possible implementations of an articulated tool cleaner 1200 according to one aspect of the invention. The tool cleaner 1200 can be activated by placing the tool to be cleaned onto the cleaner opening 1220 of a movable vacuum plenum 1210 and pressing down, causing rotation of the cleaner about a pivot 1230 held in place by channels effectuating a rotational sliding mechanism similar to the action of a standard linear motion blast gate. This rotation effectively switches the vacuum source from a vacuum tool to the cleaner, allowing both the vacuum tool and cleaner to share the same vacuum source, but not simultaneously. This switches the vacuum off to the connected vacuum tool and on to the cleaner, such that the airflow through the cleaner does not have to compete with any vacuum or airflow through the tool to be cleaned (wiped). If a brush is used, the brush is wiped across the cleaner opening, (while pressing down) providing mechanical assistance to assist the vacuum in removing hair. Releasing the downward force causes a spring to return the cleaner to the original position (via counter-rotation about the pivot point).

An auxiliary vacuum device 1250 (AVD), shown in FIG. 12(B) is designed to split the vacuum source to it in order to provide vacuum outlets 1270 to either side of the movable vacuum plenum 1210. This provides flexibility in mounting the entire unit. The unused outlet port is plugged in normal operation. One of the many alternatives readily appreciated by one skilled in the art is a simple pipe "elbow" (not shown), providing tool attachment on only one side of the movable vacuum plenum 1210. Such pipe elbow could also be configured such that it could be rotated to provide tool attachment on either side of the movable vacuum plenum 1210.

Mechanical articulation and rotation can be minimized or eliminated by using a pressure or other switch to activate pneumatic (even vacuum-driven) or electrical motorized opening and closing of respective valves to achieve the same function as that described above.

In the preferred embodiment, the articulated brush scrubber is made up of the following: a fixed 2¼" vacuum plenum 1280, to which vacuum is continuously supplied; a moveable vacuum plenum 1210, which rotates up and down around a fixed pivot point 1230. One end of the moveable vacuum plenum 1210 has an opening 1220 having a width just larger than the width of the tool to be cleaned. The other end of the moveable vacuum plenum has a sliding vacuum seal 1290 (shown in FIG. 13(B) sealing off the fixed vacuum plenum).

Figure 13C:
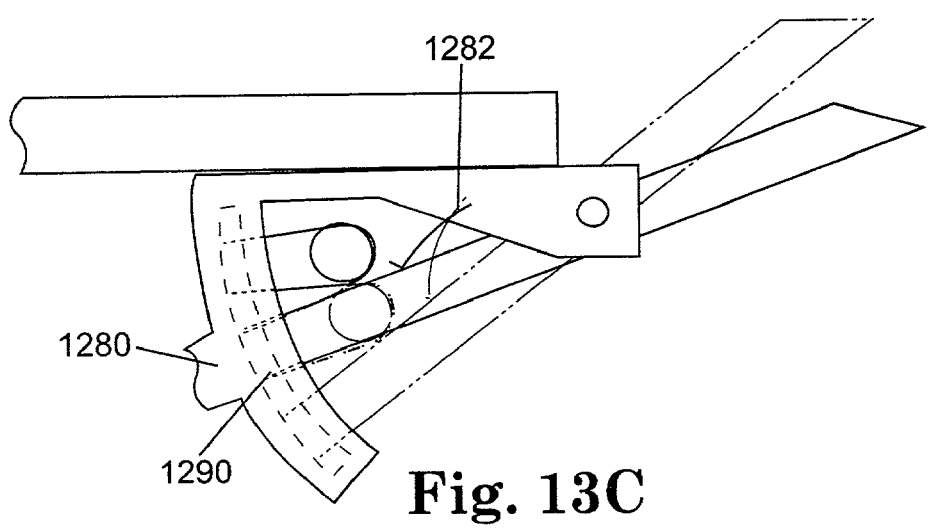

The device is activated by pushing the moveable vacuum plenum 1210 down with the tool to be cleaned. This action, as illustrated in FIG. 13(C), rotates the sliding vacuum seal 1290 off the fixed vacuum plenum 1280 and simultaneously rotates the previously open end of the moveable vacuum plenum 1210 to engage a seal with the fixed vacuum plenum 1280. This causes air flow through the moveable vacuum plenum 1210. It also stops or reduces air flow through the AVD 1250. The device being cleaned is then pushed across or inserted into the open end 1220 of the moveable vacuum plenum 1210 to release trapped hair, which is sucked up by the moveable vacuum plenum 1210, through the seal between moveable and fixed vacuum plenums and on to a vacuum source.

At the completion of the cleaning motion, pressure on the moveable vacuum plenum 1210 by the device being cleaned is released by lifting the device being cleaned. A return spring 1282 biases the moveable vacuum plenum 1210 back to the stalling position, sealing off the vacuum from the fixed vacuum plenum 1280 to the moveable vacuum plenum 1210 and restoring full vacuum to the AVD 1250. This device could be used with any standard grooming tool as well as any of the vacuum tools (with vacuum still running to such). In the case of a shedding blade, comb, rake, or de-matting tool, the tool would be cleared of trapped hair simply by engaging the open end of the moveable vacuum plenum 1210, pushing both down. No aft-fore motion of the tool would be required—the trapped hair would be just sucked off. As for a non-vacuum assisted slicker, bristle or pin brush, wiping motion of a pin brush style vacuum tool would facilitate clearing of hair from the pins. Cleaning a vacuum tool connected to its vacuum source via the AVD 1250 gains the benefit of having its vacuum supply automatically stopped or reduced through such engagement of the open end of the movable vacuum plenum 1210, effectively disconnecting the AVD 1250, and hence the source of vacuum to the vacuum tool from fixed vacuum plenum 1280.

In the preferred embodiment, the device has a sufficient seal so that leakage is not a significant source of noise. Also, the seal remains adequate throughout many cycles. In addition the vacuum plenums are designed with aerodynamically smooth inner surfaces to avoid generation of noise. Finally, the entire tool cleaner is designed as a single unit that can easily be attached (with screws, etc.) to either the top or bottom of a grooming table 1302, or to a wall so to provide easy, natural access to such by any tool held in a groomer's hand.

With this implementation, a vacuum source could easily be shared between the tool cleaner and vacuum tools. Doing so may even make both tools work better. Full vacuum would be available to the vacuum tool when grooming. Activation of the tool cleaner would release some or all of the vacuum from the vacuum tool, making it that much easier for the tool cleaner to suck trapped hair off the vacuum tool. Full vacuum would be restored to the vacuum tool upon release of the tool cleaner. All of this action is accomplished with just the one hand holding the tool that is to be "scrubbed" of hair.

The invention claimed is:

1. A system comprising:
   (a) an animal grooming tool including
      1. a vacuum nozzle having a hollow body terminating in a mouth opening and attachable to a vacuum source, and
      2. a grooming device spanning the mouth opening, the grooming device having two sides and positioned with respect to the mouth opening to allow airflow created by the vacuum source to flow over at least one of the two sides of the grooming device; and
   (b) a grooming tool cleaning bead having a nozzle attachable to the vacuum source, the nozzle having an opening with respect to which the grooming device can be positioned in proximity to induce removal of animal hair attached to the grooming device by airflow generated by the vacuum source.

2. The system of claim 1, further comprising a switch operatively attached to the vacuum nozzle of the animal grooming tool and the nozzle of the grooming tool cleaning head, the switch configured to alternatively place the vacuum nozzle of the animal grooming tool or the nozzle of the grooming tool in fluid communication with the vacuum source.

3. The system of claim 2, wherein the switch comprises:
   (a) a first support;
   (b) a first port mounted on the support;
   (c) a second and third ports in respective fluid communication with the vacuum nozzle of the animal grooming tool and the nozzle of the grooming tool cleaning head, and alternately positionable to be in fluid communication with the first port.

4. The system of claim 3, wherein the second and third ports are mounted on a second support that is pivotable between at least two positions with respect to the first support, wherein the first port is in fluid communication width the second port when the second support is in the first of the two positions, and with the third port when the second support is in the second of the two positions.

5. A vacuum cleaning tool cleaner, comprising:
   a grooming tool cleaning head having a first nozzle attachable to a vacuum source, the first nozzle having an opening positionable in proximity to a grooming device such that animal hair attached to the grooming device can be removed from the grooming device by airflow generated by the vacuum source; and
   a switch operatively attached to a second nozzle associated with a grooming tool and the first nozzle and configured to place the first nozzle and the second nozzle in alternate fluid communication with the vacuum source.

6. A system comprising:
   an animal grooming tool including (1) a vacuum nozzle having a hollow body terminating in a mouth opening and attachable to a vacuum source, and (2) a grooming device disposed within and spanning the mouth opening, the grooming device having two sides and positioned with respect to the month opening to allow negative airflow created by the vacuum source to flow over at least one of the two sides of the grooming device; and
   a grooming tool cleaning head having a nozzle attachable to the vacuum source, the nozzle having an opening which when proximate to a grooming hand tool containing accumulated animal hair removes the accumulated animal hair with suction generated by the vacuum source through the grooming tool cleaning head.

7. The system of claim 6, wherein the grooming hand tool comprises the animal grooming tool.

8. The system of claim 6, wherein the grooming hand tool comprises one or more of a comb, a bristle brush, a pin brush, a shedding tool, a de-matting tool, and a rake.

9. A grooming tool cleaner comprising:
- a grooming tool cleaning head having a first nozzle attachable to a vacuum source, the first nozzle having an opening into which negative airflow is induced by the vacuum source and when the opening is proximate to a grooming tool, the airflow removes animal hair attached to the grooming tool; and
- a switch operatively attached to a second nozzle associated with a vacuum-assisted grooming tool and the first nozzle, the switch configured to place either, but not both, the first nozzle or the second nozzle in fluid communication with the vacuum source.

10. A grooming tool cleaner comprising:
- a grooming tool cleaning means for removing animal hair attached to a grooming tool, the grooming tool cleaning means having a first nozzle operatively attachable to a source of negative pressure, the first nozzle having an opening into which negative airflow is induced by the source of negative pressure and when the opening is proximate to a grooming tool, the airflow removes animal hair attached to the grooming tool; and
- a switch means, operatively attached to a second nozzle associated with a vacuum-assisted grooming tool and the first nozzle, for placing either, but not both, the first nozzle or the second nozzle in fluid communication with the source of negative pressure.

11. A grooming tool cleaner comprising:
- a grooming tool cleaning head having a first nozzle attachable to a vacuum source, the first nozzle having an opening with respect to which a pressure differential is induced between the vacuum source and the opening, the opening being compatible with a shape of an operative portion of a grooming tool so as to increase the pressure differential's affect upon the operative portion of the grooming tool and when the operative portion of the grooming tool is engaged with the opening the pressure differential removes animal hair attached to the operative portion of the grooming tool; and
- a switch operatively attached to a second nozzle associated with a vacuum-assisted grooming tool and the first nozzle, the switch having two states, a first state in which the first nozzle is placed in fluid communication with the vacuum source and a second state in which the second nozzle is placed in fluid communication with the vacuum source, the switch being biased to remain in the second state during grooming operations and transitioning from the second state to the first state and thereby effectively disconnecting the vacuum source from the vacuum-assisted grooming tool and inducing negative airflow into the grooming tool cleaning head responsive to engagement of the vacuum-assisted grooming tool with the grooming tool cleaning head wherein the negative airflow removes animal hair attached to the vacuum-assisted grooming tool.

* * * * *

UNITED STATES PATENT AND TRADEMARK OFFICE
CERTIFICATE OF CORRECTION

| | |
|---|---|
| PATENT NO. | : 7,159,274 B2 |
| APPLICATION NO. | : 10/147802 |
| DATED | : January 9, 2007 |
| INVENTOR(S) | : James E. Freidell |

It is certified that error appears in the above-identified patent and that said Letters Patent is hereby corrected as shown below:

On Title page, in column 2 at line 25 delete "Paegre" and insert --Faegre--
In column 8 at line 12 delete "bead" and insert --head--
In column 8 at line 37 delete "width" and insert --with--

Signed and Sealed this

Tenth Day of April, 2007

JON W. DUDAS
*Director of the United States Patent and Trademark Office*